(12) United States Patent
Furuno

(10) Patent No.: US 7,061,911 B2
(45) Date of Patent: Jun. 13, 2006

(54) COMMUNICATION DEVICE, EDGE DEVICE AND PACKET FORWARDING METHOD

(75) Inventor: Takayuki Furuno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1096 days.

(21) Appl. No.: 10/033,559

(22) Filed: Dec. 27, 2001

(65) Prior Publication Data

US 2003/0031192 A1    Feb. 13, 2003

(30) Foreign Application Priority Data

Aug. 8, 2001    (JP) .............................. 2001-241037

(51) Int. Cl.
*H04L 12/28* (2006.01)

(52) U.S. Cl. ....................... 370/392; 370/401

(58) Field of Classification Search .................... None
See application file for complete search history.

(56) References Cited

U.S. PATENT DOCUMENTS

2004/0202171 A1*    10/2004    Hama ....................... 370/395.1

FOREIGN PATENT DOCUMENTS

JP    2000278314    10/2000

* cited by examiner

*Primary Examiner*—Chau Nguyen
*Assistant Examiner*—Jung Park
(74) *Attorney, Agent, or Firm*—Katten Muchin Rosenman LLP

(57) ABSTRACT

An edge device is disposed at an entrance of a MPLS domain. The edge device, when receives a packet attached with a local label from a communication device of users side, extracts a destination label corresponding to the local label from a label learning table, rewrites the local label in the packet with the extracted label, and transmits the packet to a neighboring LSR corresponding to the extracted label within the MPLS domain.

14 Claims, 10 Drawing Sheets

COMMUNICATION DEVICE, EDGE DEVICE AND PACKET FORWARDING METHOD

BACKGROUND OF THE INVENTION

1. Field of the Invention

The present invention relates to a communication device, an edge device and a packet forwarding method. The present invention relates to a technology schemed to enhance and increase an efficiency of services of MPLS (Multi protocol Label Switching) utilized as a backbone technology for IP-VPN (Internet Protocol-Virtual Private Network) services provided by carriers and also utilized for configuring the VPN on MAN (Metropolitan Area Network) over the recent years.

2. Description of the Related Art

The IP-VPN is capable of easily configuring a multipoint-to-multipoint network in a fee system that does not depend on the distance. Therefore, not only new users but also the users having utilized the conventional leased lines so far come to utilize the IP-VPN, and a sharp rise in demand for the IP-VPN can be seen.

Further, there will be a demand for the MPLS for configuring a high-speed and secure network when introducing a local information highway with a shift to the electronic government. To give a deeper insight, if the cost for the introduction of the MPLS decreases by a spread of the MPLS, it can be considered that the MPLS is applied to an intra-office LAN (Local Area Network).

In the case of exemplifying the IP-VPN services having the largest influence on activating the MPLS market, the MPLS can be provided to end users simply by introducing the MPLS into a carrier backbone (core network) without having any influence on the existing access circuits and use communication devices.

The carriers initially did not provide network services being able to understand the IP (Internet Protocol). The mass of traffics of the users become, however, the IP by the spread of the Internet, and traffic size (quantity) rises skywards. Paying the attention to this tendency, the carriers schemed to incorporate the IP routing function into the networks. Then, the carriers put a focus on the MPLS from which to yield effects by an intensive investment into the core network.

According to the MPLS, routing information obtained by operating a routing protocol (such as RIP (routing Information Protocol), OSPF (Open Shortest Path First), BGP (Border Gateway protocol) on the network layer, is assigned as a "label" having a short fixed length to a physical link between MPLS devices.

The label is similar to VPI/VCI (Virtual Path Identifier/Virtual Channel Identifier) in ATM (A synchronous Transfer Mode) and can be treated as if a connection between arbitrary networks (according to the MPLS, this connection is called LSP (Label Switched Path)). Accordingly, the MPLS is capable of enhancing the forwarding performance and easily managing the traffic as by the ATM.

At the present, network resources of the carriers are sufficient for the user's traffic quantity, and hence a load (cost) on the communication facilities of the carriers does not become excessive. In the future, however, there might arise an anxiety for an increase in the load especially upon the edge devices actualizing a large proportion of the functions of the MPLS.

The edge devices actualize roughly two functions. One function is a function of converging and integrating a variety of access circuits. Another function is an MPLS function provided within the MPLS domain. The former functions, as a matter of course, give a direct influence to the increase in the load upon the edge device. The latter MPLS function is categorized as hardware (device) in the MPLS domain into an edge device (edge node) and a label switching router (LSR).

The functions of the LSR are simplified in its function for gaining a higher speed. The LSR performs both of operations (a label assignment and so on) related to the routing protocol and LDP (Label Distribution Protocol), and label switching (forwarding).

On the other hand, the edge device needs, in addition of the operations based on the routing protocol and the LDP and the IP address based packet forwarding process of the IP packet based on the IP address, attach and remove the label used in the MPLS domain to and from the packet, and perform label switching and priority control and the like.

FIG. 10 shows conventional MPLS functions sharing. As shown in FIG. 10, an edge device located in backbone of a carrier network terminates a MPLS domain. Hence, as a matter of course, the label is unable to be recognized outside the MPLS domain.

Referring to FIG. 10, an edge device (entrance edge device) corresponding to an entrance of the MPLS domain (receiving the packet from a communication device of users side (user communication device)) receives the IP packet from the user communication device as a sender (transmitting side), and searches for an entry matching with a destination IP address from a routing table in the same algorithm as the normal IP routing.

In the MPLS domain, the label is determined for every routing entry on the basis of the LDP and the like, and the edge device recognizes the label from a result of the search and pads (attaches; inserts) the label to the IP packet. Then, this labeled packet is forwarded into the MPLS domain.

Each of the LSRs receives the IP packet and performs forwarding based on the label (label switching). Thus, the IP packet is transferred (across the LSRs) to the edge device (exit edge device) that is an exit of the MPLS domain. The exit (egress) edge device removes the label from the IP packet, and the IP packet is transferred to the user communication device as a receiver on the basis of the destination IP address.

Normally, an access circuit interface (which is a UNI (User-Network Interface) between the user communication device and the edge device in FIG. 10) accommodating the user, has no routing function on the layer 3 (network layer), and there is carried out a point-to-point transmission of the IP packet on the layer 2 (data link layer) or thereunder.

As explained above, the edge devices are given large shares of roles in the MPLS. Especially the entrance edge device (in the prior art) that forwards the packet into the MPLS domain from the user communication device, must executes steps such as invariably referring to the destination IP addresses of all the IP packets, searching the routing table, attaching the labels and forwarding the IP packets to the output port.

The edge device is incapable of performing label switching during a packet flow from the user communication device into the MPLS domain, and therefore an enhanced forwarding performance can not be expected during this flow. According to the prior art, only the LSRs excluding the edge devices in the MPLS domain are given a label switching capability.

Further, the edge devices often take such a form that plural types of access circuits accommodate a tremendous number of user communication devices, and a more strict user management is demanded of IP-VPN and so on. It is therefore clear that the performance of the edge device becomes a bottleneck when viewed from an end-to-end architecture (application).

SUMMARY OF THE INVENTION

It is a primary object of the present invention to provide a communication device, an edge device and a packet forwarding method that are capable of relieving a load on the edge devices in the MPLS.

To accomplish the above object, present invention adopts the following architectures.

According to one aspect of the present invention, a user communication device transferring a packet via an MPLS domain to a destination network, comprises a retaining module retaining a local label as a label assigned to the destination network and obtained by a method different from a label distribution method in the MPLS domain, a receiving module receiving the packet that should be forwarded to the destination network, a transmitting module transmitting the received packet towards an edge device disposed at an entrance of the MPLS domain, and an attaching module reading the local label corresponding to the destination network from the retaining module and attaching the local label to the packet transmitted from the transmitting module so that the edge device executes a forwarding process of the packet received from the user communication device on the basis of the local label attached to this packet.

According to another aspect of the present invention, an edge device forwarding a packet received from a communication device of users side into an MPLS domain, comprises a retaining module retaining a local label as a label corresponding to a destination network of the packet received from the user communication device and obtained by a method different from a label distribution method in the MPLS domain, and a label corresponding to the local label and obtained by the label distribution method in the MPLS domain, a receiving module receiving a packet attached with the local label from the user communication device, and a forwarding module reading, from the retaining module, the label corresponding to the local label attached to the packet received by the receiving module, then rewriting the local label attached to the packet with the read label, and forwarding the packet into the MPLS domain.

According to a further aspect of the present invention, there is provided a packet forwarding method of the communication device or the edge device.

According to the present invention, the edge device is capable of, when executing the process of forwarding the packet received from the communication device, forwarding the packet into the MPLS domain by the label switching that uses the local label attached to the packet. Accordingly, it is possible to relieve the load on the forwarding process by the edge device and to speed up the forwarding process.

DESCRIPTION OF THE PREFERRED EMBODIMENTS

Embodiments of the present invention will hereinafter be described with reference to the accompanying drawings. Each of configurations shown in the embodiments is exemplification, and the present invention is not limited to the configurations in the embodiments.

[Outline of the Present Invention]

Figure 1:
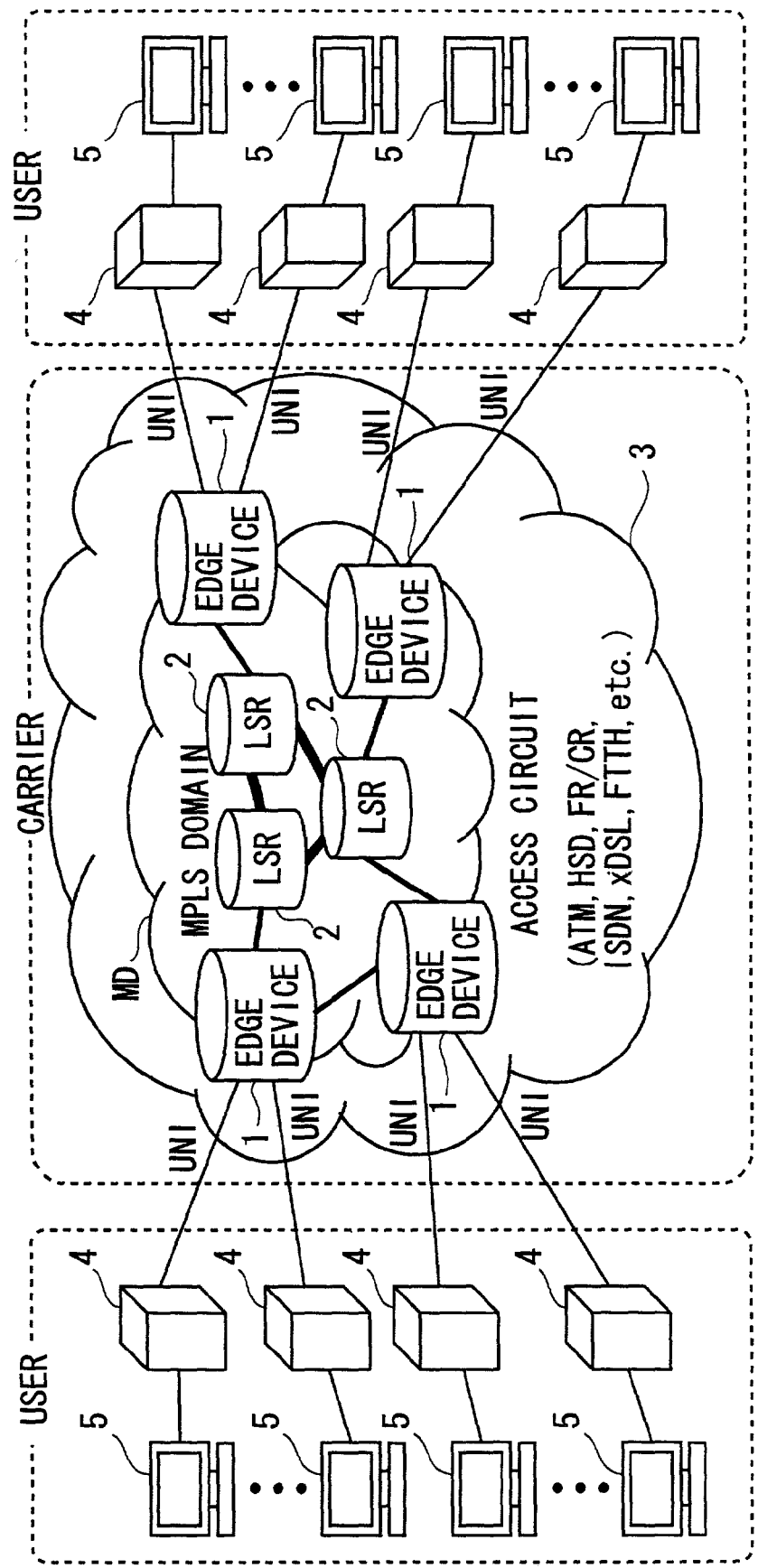
FIG. 1 is a view showing an example of an MPLS network to which the present invention is applied.

FIG. 1 is a view showing a general MPLS network in which data is forwarded by an MPLS technology. The MPLS network functions as a backbone network of a plurality of user networks (local IP networks or IP terminal). The MPLS network includes an MPLS domain MD functioning as a core network, and an access circuit network 3 interfaces each of the user networks to the MPLS domain MD. The MPLS domain MD and the access circuit network 3 are linked to configure a carrier network actualized by use of communication equipment of a carrier.

The MPLS domain MD includes a plurality of edge devices (edge nodes) 1 disposed at a boundary between the MPLS domain MD and the access circuit network 3, and at least one core node (LSR) 2 that connects the edge devices 1 with each other. The LSR 2 and the edge device 1 are linked (NNI: Network-to-Network Interface) as the necessity may arise.

The edge device 1, in addition of a general routing protocol operation and a packet routing (switching) process based on the IP address, has both of an IP routing function and an MPLS routing function that involve an LDP (Label Distribution Protocol) operation for determining a label used in the MPLS domain MD, attaching/removing a label used in the MPLS domain MD to and from the packet and label-based switching. The LSR 2 mainly executes the LDP in linkage with the edge device 1 and a label-based routing process (label switching).

The access circuit network 3 may be, for instance, a WAN (Wide Area Network) and has a plurality of access circuits (UNI (User-Network Interfaces) for providing a communication service for interfacing the user networks to the MPLS domain MD, such as ATM, HSD (High Super Digital), FR (Frame Relay)/CR, ISDN, xDSL, FTTH and so on.

Each of the user networks includes at least one user communication device 4 according to at least one user device 5. The user communication device 4 is connected via any one of the access circuits (UNI) in the access circuit network 3 to any one of the edge devices 1 through on the layer 2 or higher (MPLS layer or higher).

The user communication device 4 is a user's own device for connecting the user device 5 to the access circuit network 3. What can be applied as the user communication device 4 is specifically a router, a layer three switch and so forth that have a control function over the layer 3 or lower. The user device 5 is a user's own communication terminal device. What can be applied as the user device 5 is, for instance, a general-purposed/dedicated computer functioning as a communication terminal device such as a PC (Personal Computer) WS (WorkStation), a mobile computer and so on.

Figure 2:
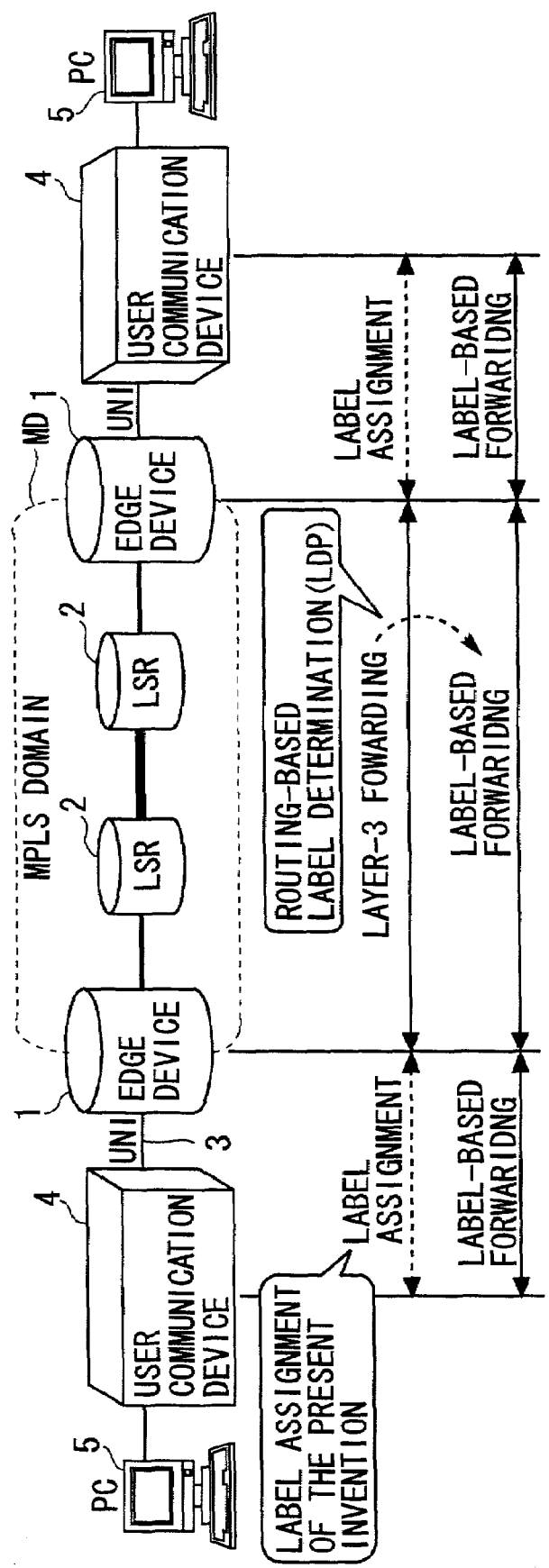
FIG. 2 is an explanatory view showing MPLS function sharing according to the present invention.

According to the present invention, the user communication device 4 handles the labels in order to relieve a load upon the edge device 1. FIG. 2 is an explanatory view showing MPLS function sharing according to the present invention. In the present invention, as shown in FIG. 2, a labeled packet is forwarded to the UNI outside the MPLS domain. The label to be attached to the IP packet (labeled packet) by the user communication device 4 is generated and retained by the user communication device 4 them.

The edge device 1, when receiving the labeled packet, learns a label mapping between the label attached the labeled packet and an assigned label specifying a next hop (a next router) to a destination network. With this label mapping, the edge device 1 is capable of forwarding the labeled packet transmitted from the user communication device 4 simply by a label mapping process, whereby a load on the forwarding process can be reduced to a large extent.

Thus, the user communication device according to the present invention, without depending on an MPLS label distribution method (e.g., the Label Distribution Protocol) of distributing the label used on the MPLS domain, generates locally (based on a local rule) the label unique to every destination network, retains this label in a routing table, then attaches, when receiving a packet to a certain destination network from on a LAN (user network), the label as an MPLS label to this packet, and thus transmits the labeled packet to the entrance edge device.

Further, the edge device according to the present invention, when receiving the labeled packet from the user communication device and judging that this label is not yet registered, searches for a next hop in the routing table by referring to a destination address of this packet, and attaches a label specifying the next hop within the MPLS domain (what this edge device behaves so far is the same as the typical entrance edge device does). The edge device of the present invention relates the label attached to the packet to the label specifying the next hop searched and stores the labels in the table, and, when receiving the packet attached with the same label thereafter from the user communication device 4, forwards the packet by use of the piece of label information in the table.

Further, the user communication device 4 according to the present invention is capable of receiving a tuple of a label used in the UNI outside the MPLS domain MD and the destination network by a message from the edge device 1, and retaining the label information contained in this message. The user communication device 4, when receiving the packet coincident with this piece of label information from the LAN (user network), is also capable of attaching the retained label to the packet and forwarding the labeled packet to the edge device 1.

Moreover, the edge device 1 according to the present invention is capable of generating and retaining a label relating to the label used in the MPLS domain MD, and transmitting a message containing one or plural pieces of label information having a tuple of the retained label and the destination network to the user communication device 4 on the UNI outside the MPLS domain MD.

First Embodiment

Figure 3:
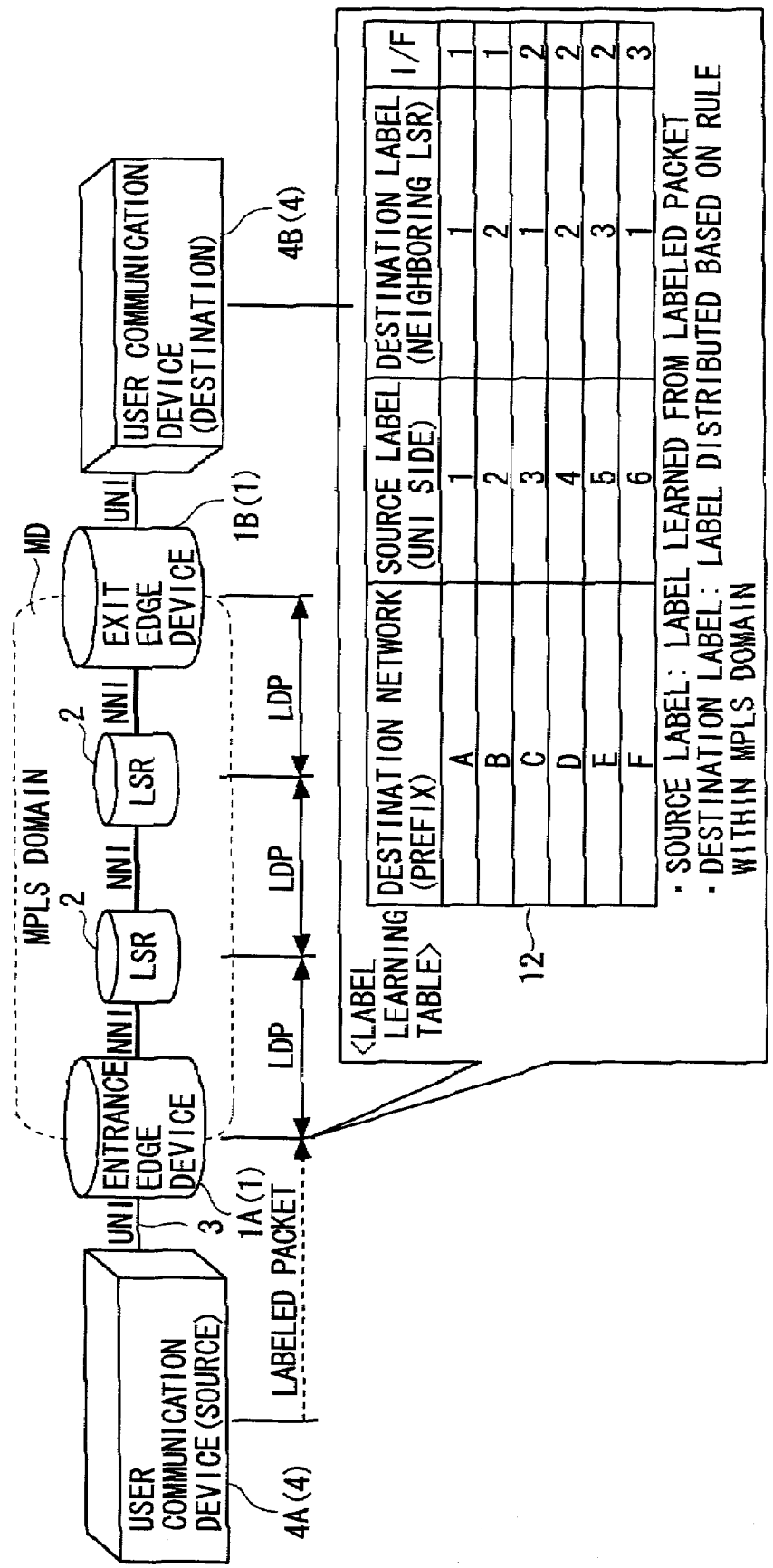
FIG. 3 is a view showing a first embodiment of the present invention.

FIG. 3 is a view showing a first embodiment of the present invention. FIG. 3 illustrates how a source user communication device 4 (which will hereinafter be referred to as a "user communication device 4A") sends the packet to a destination user communication device 4 (which will hereinafter referred to as a "user communication device 4B") via a carrier network.

Further, FIG. 3 also shows, when the user communication device 4A transmits a labeled packet to an edge device 1 disposed on an entrance of the MPLS domain MD (which will hereinafter be called an "entrance edge device 1A"), an example of a table (label learning table) 12 held by the entrance edge device 1A that retains the label of this labeled packet.

According to the first embodiment, the user communication device 4A as the source (transmitting side) of the IP packet generates a UNI label (that will hereinafter be called a "local label" in a sense of distinguishing it from the public label used in the MPLS domain) assigned per destination network.

The local label can be generated based on the local rule of the user communication device 4A. For example, the local label can be generated by assigning a sequential value (20 bits) to the destination network as a label value per destination network.

The generated local label is retained in the user communication device 4A and in the edge device 1A as well. For instance, the local label is retained in the label learning table 6 (see FIG. 4) of the user communication device 4A and retained in the label learning table 12 of the edge device 1A as shown in FIG. 3. The local labels are retained in a way of their being related to the routing tables 7, 13 (see FIGS. 4 and 5) held respectively by the user communication device 4A and the edge device 1A. By contrast, however, the local labels may also be retained in the routing tables 7 and 13.

Then, the user communication device 4A, when executing the routing process of the IP packet forwarded from upstream, i.e., from the LAN (the user network) towards the WAN (the access circuit network 3), extracts (reads) the local label corresponding to the destination network from the label learning table 6, then attaches the extracted local label to the IP packet, and forwards the labeled IP packet to a WAN port. In this case, a method of attaching the local label to the packet is based on the MPLS.

The edge device 1A receiving the labeled packet learns a relationship between a destination address of the packet and the label, and stores it in the label learning table 12. The label learning table 12, when the edge device 1A receives the labeled packet from the user communication device 4A, is used for the edge device 1A to search for and extract a new label specifying a next hop corresponding to the destination by the local label attached to the packet serving as a key, then replace the label attached to the packet with the new label, and forward the labeled packet to the next hop.

With the process, the edge device 1A is able to attain the label forwarding which relieves the processing load to a greater degree than by the IP address-based forwarding process, namely, the edge device 1A does not needs the process of detecting the destination network from the destination IP address contained in the packet, extracting the label corresponding to this destination network and attaching the label to the packet. Accordingly, the processing load on the edge device 1A is relieved.

Figure 4:
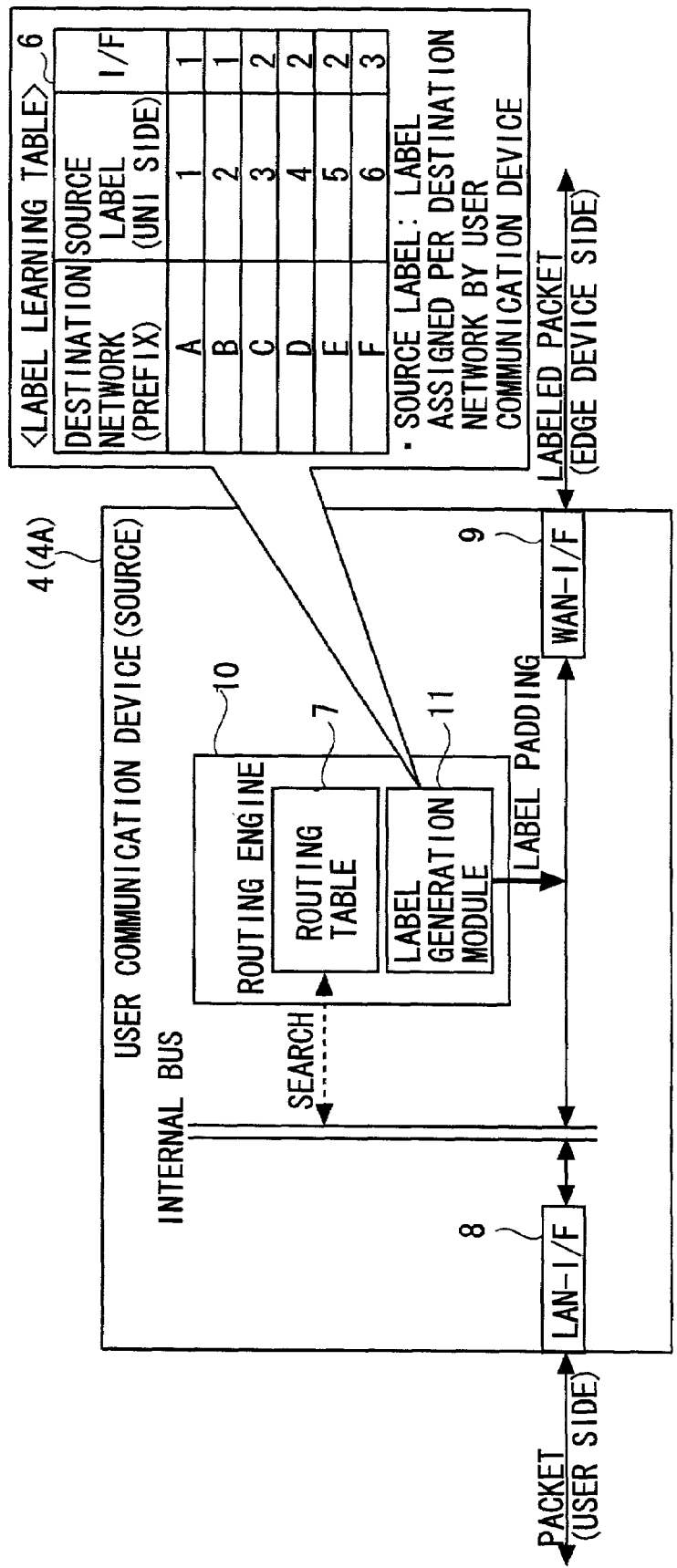
FIG. 4 is a view showing an example of a user communication device in the first embodiment.

FIG. 4 is a view showing an example of the user communication device 4 in the first embodiment. FIG. 4 mainly illustrates an architecture (configure; structure) in which the user communication device 4 functions as the user communication device 4A as the sender (source) of the packet.

As shown in FIG. 4, the user communication device 4 includes at least one LAN interface (LAN-I/F: LAN port) 8, at least one WAN interface (WAN-I/F: WAN port) 9 and a routing engine 10, which are connected to each other via an internal bus.

The LAN-I/F 8 controls a packet transmitting/receiving function to and from the user device 5 connected to the user communication device 4. The WAN-I/F 9 controls a labeled packet transmitting/receiving function to and from the edge device 1.

The routing engine 10 includes the routing table 7, the label learning table 6 and the label generation module 11. The routing engine 10 operates based on routing protocols (such as RIP (Routing Information Protocol), OSPF (Open Shortest Path First), BGP (Border Gateway Protocol) and so on), generates and holds the routing table 7, and executes the packet forwarding process.

In particular, the routing engine 10 inserts the appropriate local label corresponding to the destination network to the packet in the flow toward the edge device 1 by referring to the label learning table 6.

Note that implementing either software used for a processor to execute programs can actualize the function of the routing engine 10 and data stored in a storage unit (memory) or dedicated hardware.

The routing table 7 is stored with entries of the routing information obtained by manual settings (static routing) or by the routing protocol based operations (dynamic routing). Each entry is provided per IP packet destination network and contains an address (prefix) of the IP packet destination network, an IP address of the next hop corresponding to the destination IP network, and identifying information of an output I/F (output port) corresponding to the next hop.

Note that the next hop indicates the edge device 1 (1A) in the upstream direction (toward the edge device 1 from the user device 5), and indicates other router in the user network or a layer three switch (other user communication device) in the downstream direction (toward the user device 5 from the edge device 1). The output I/F indicates the corresponding WAN-I/F 9 in the upstream direction, and the corresponding LAN-I/F 8 in the downstream direction.

According to the first embodiment 1, however, an assumption is that the user network has only one user communication device 5, and the routing table 7 retains only the addresses of the IP networks connected via the carrier network as the addresses of the destination IP networks.

The label generation module 11 generates the local label unique to every destination network in accordance with an independent rule different from the label generation rule (label assignment rule) in the MPLS domain, and entries containing the generated local labels in the label learning table 6.

The label learning table 6 retains the entries each corresponding to every destination IP network stored in the routing table 7. Each entry contains pieces of identifying information such as an address (prefix) of the destination network, a local label (shown as a source label on the UNI side in FIGS. 3 and 4) value (label value) generated corresponding to the address of the destination IP network, and an output I/F (output port) corresponding to the local label.

By contrast, however, each entry of the routing table 7 may also retain the local label value corresponding to the address of the destination IP network. In this case, there is no necessity of holding the label learning table 6 separately from the routing table 7.

Note that the LAN-I/F 8 corresponds to a receiving module of the user communication device, the WAN-I/F 9 corresponds to a transmitting module, the routing engine 10 (the label learning table 6) corresponds to a retaining module, and the routing engine 10 (the label generation module 11) corresponds to an attaching module and a generation module as well according to the present invention.

Figure 5:
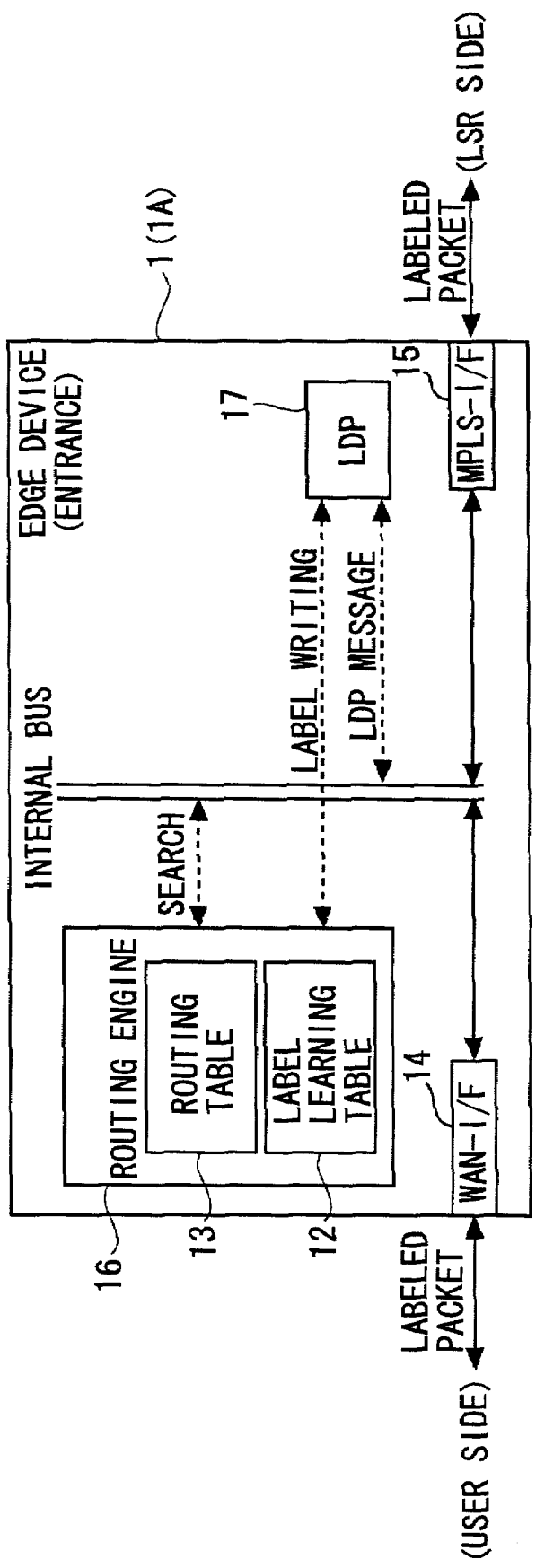
FIG. 5 is a view showing an example of an edge device in the first embodiment.

FIG. 5 is a view showing an example of the edge device 1 in the first embodiment. FIG. 5 mainly illustrates an architecture in which the edge device 1 functions as the entrance edge device 1A.

As shown in FIG. 5, the edge device 1 includes at least one WAN interface (WAN-I/F: LAN port) 14, at least one MPLS interface (MPLS-I/F: MPLS port) 15, a routing engine 16 and an LDP manager 17, which are connected to each other via an internal bus.

The WAN-I/F 14 controls a function of receiving the labeled packet from the user communication device 4A. The MPLS-I/F 15 controls a labeled packet transmitting/receiving function to and from a neighboring LSR 2.

The routing engine 16 includes the routing table 13 and the label learning table 12 shown in FIG. 3. The routing engine 16 operates (such as searching for an optimum route within the MPLS domain MD and so forth) based on the routing protocols (such as the RIP, OSPF, BGF and so on), generates and hold the routing table 13, and executes a label switching process of the packet.

The routing table 13 is held also by the conventional edge device and is stored with the routing information obtained by operating the routing protocols. The routing table 13 is stored with the entry per destination network. Each entry contains, e.g., an IP address of the destination network, an address of the next hop, a input (receiving) label value (of the label attached to the packet received by the edge device 1) corresponding there to, an output (transmitting) label value (of the public label obtained by the label distribution method such as the LDP and so on) corresponding to the input (receiving) label, and identifying information of an output (transmitting) interface corresponding to the output (transmitting) label.

The label learning table 12 is a new category of table according to the present invention and retains the local label attached to the packet receiving from the user communication device 1A and the corresponding label (having the label value used for the label switching within the MPLS domain MD) obtained by the label assignment method such as LDP (Label Distribution Protocol) and so forth.

To be specific, the label learning table 12 retains, as shown in FIG. 3, the entry per destination network. Each entry contains an address (prefix) of the destination network, a local label (a source label on the UNI side) corresponding to this address, a destination label (a label of the neighboring LSR) corresponding to the local label, and identifying information of an output I/F (MPLS-I/F 15) corresponding to the destination label.

The routing engine 16 and LDP manager (LDP control module) 17 cooperate to generate the label learning table 12. The routing engine 16, with the routing protocol executed, exchanges the routing information with the neighboring nodes (the edge device 1 and the LSR 2) in the MPLS domain MD. The routing engine 16 thereby obtains the optimum route per destination network, and stores the routing table 13 with an address of the destination network corresponding thereto and an address of the next hop corresponding to this address.

The LDP manager 17, if a new LSP is newly set on the MPLS domain MD, exchanges, e.g., LDP-based messages (a label request message and a label mapping message) with the neighboring LSR corresponding to the node on the LSP (wherein addresses of the messages are detected by use of the routing table 13).

In general, the label request message is transferred from the entrance edge device 1A via the relay LSP to the exit edge device 1B, and the label mapping message is transferred from the exit edge device 1B via the relay LSR to the entrance edge device 1A.

The label mapping message contains the label (input label) to the next hop. The relay LSR, when receiving the label mapping message, stores the routing table with the label contained in this message as a label (output label) to the next hop, then generates a label corresponding to the label to the next hop, rewrites the label contained in the label mapping message with this generated label, and transfers this label mapping message to the node disposed in the down direction (upstream side) of the relay LSR itself.

Accordingly, the entrance edge device 1A, when the LSP is set, transmits the label request message to the next hop (the neighboring LSR) corresponding to the destination network, and receives the label mapping message containing the label specifying the next hop from this neighboring LSR.

Then, the LDP manager 17 relates the label specifying the next hop to the destination network, writes, to the routing table 13, the label, and writes the label as a destination label to the label learning table 12. The routing engine 16 or the LDP manager 17 may also execute the process of writing the address of the destination network to the label learning table 12.

Further, the source label (local label) is stored in the label learning table 12 in such a way that the routing engine 16, when receiving the labeled packet from the user communication device 4A, acquires the local label of this labeled packet and writes the acquired label to the table 12.

Note that each entry of the routing table 13 may retain the local label corresponding to the address of the destination IP network. In this case, there is no necessity of having the label learning table 12 separately from the routing table 13.

Moreover, implementing either software used for the processor to execute programs can actualize the functions of the routing engine 16 and the LDP manager 17 and data stored in the storage unit (memory) or dedicated hardware.

Note that the WAN-I/F 14 corresponding to a receiving module of the edge device, the routing engine 16 (the label learning table 12) corresponding to a retaining module, and the routing engine 16 and the MPLS-I/F 15 correspond to a relay module according to the present invention.

Next, an operation (a packet forwarding method) in the first embodiment will be described with reference to FIGS. 3, 4 and 5. For example, when a certain user communication device 4A receives at the LAN-I/F 8 an IP packet addressed to other IP network from the user device 5, this IP packet is transferred to the routing engine 10.

The routing engine 10, when receiving the IP packet from the LAN-I/F 8, extracts (reads) a destination IP address stored in the header of the IP packet and, with the read IP address used as a key, searches for a corresponding destination network by referring to the label learning table 6.

In this case, when, e.g., a destination network "A" is detected as the destination network, reads a local label (source label) corresponding to the destination network "A" and a piece of identifying information of an output I/F from the label learning table 6.

Subsequently, the routing engine 10 (e.g., the label generation module 11 of the routing engine 10) attaches (pads; inserts) the local label to the IP packet and sends the labeled packet to the WAN-I/F 9 identified by the identifying information. The labeled packet is thus sent to the WAN-I/F 9 and forwarded from this WAN/-I/F 9.

The labeled packet transmitted from the user communication device 4A is forwarded to the edge device 1A corresponding to the destination network via the access circuit network 3 (UNI) In the access circuit network 3, only the processes on the layer 2 or lower are executed on the labeled packet, but none of the label-related processes are carried out.

The edge device 1A, when receiving the labeled packet at the WAN-I/F 14, sends this labeled packet to the routing engine 16. The routing engine 16 extracts (reads) the local label from the labeled packet, and searches for an entry corresponding to the local label in the label learning table 12.

In this case, if the entry corresponding to the local label is searched for, the routing engine 16 extracts from the label learning table 12 a destination label (specifying the next hop) stored in the entry concerned and a piece of identifying information of the output I/F, then rewrites the local label of the labeled packet with the destination label, and sends this packet to the MPLS-I/F 15 identified by the identifying information.

The MPLS-I/F 15, when receiving the labeled packet, forwards this packet to the LSR 2 identical with a neighboring LSR specified by this label. Thus, the forwarding process of forwarding the labeled packet into the MPLS domain MD is executed.

By the way, the routing engine 16, if the entry corresponding to the local label is not searched for, extracts (reads) the destination IP address contained in the labeled packet, and, with this address used as a key, searches for a corresponding entry (a destination label corresponding to the destination network) from the routing table 13.

If the corresponding entry is detected from the routing table 13, the routing engine 16 executes (reads) the forwarding process (rewriting of the label), then creates an entry containing the destination network, the local label and the destination label, and writes this entry to the label learning table 12. Thus, (the routing engine 16 of) the entrance edge device 1A learns the local label corresponding to the destination network.

Note that the routing engine 16 may creates the label learning table 12 in a status of being entered with the local label on the basis of the routing table 13 and may write the local label in a corresponding field whenever receiving the local-labeled packet, thereby completing the label learning table 12 (learning the local label).

The labeled packet sent (transmitted) from the entrance edge device 1A is forwarded to the exit edge device 1B through the LSP led to the destination network. In this case, the labeled packet is received by the LSRs 2 (at least one relay LSR including the LSR neighboring to the entrance edge device 1A: the two LSRs in the example shown in FIG. 3) existing (disposing) on the LSP. The labeled packet is forwarded to the exit edge device 1B through the label switching by this relay LSR 2.

The exit edge device 1B, when receiving the labeled packet from the neighboring LSR from the MPLS-I/F 15, the routing engine 16 thereof terminates the LSP (removes the label from the labeled packet). Then, the IP packet with the label removed is sent from the WAN-I/F 14 toward the user communication device 4B corresponding to the destination network, and thus forwarded to the user communication device 4B via the access circuit (UNI) Further, this IP packet is forwarded to the destination user device 5 by the processes on the layer 2 or lower in the user communication device 4B.

According to the first embodiment, the entrance edge device 1A may forward the packet into the MPLS domain MD by the label switching based on the local label attached in the user communication device 4A.

Hence, there is eliminated the necessity of detecting the corresponding label on the basis of the destination network and attaching this label to the IP packet as done in the prior art. It is therefore possible to relieve the processing load on the entrance edge device and to enhance a forwarding performance (a throughput) in the upward direction. This contributes to speed up the network services to the end users (of the user devices 5) and reduce the costs for these services.

Note that the LDP is exemplified as the protocol for assigning the label used in the MPLS domain MD in the first embodiment. This label assignment protocol may involve applying CR-LDP (Constrained based-LDP) and RSVP-TE (Resource reSerVation Protocol-Traffic Engineering) cooperating with RSVP. If the MPLS domain MD is small-scaled, the label managed by manual handling may be set manually in the respective devices (the edge device and the LSR).

Further, the destination user communication device 4B does not forward the packet by use of the label, and hence there is no necessity of assigning the label between the exit edge device 1B and the destination user communication device 4B. As a matter of course, the user communication device 4B on the receiving side may execute the process of removing the label in order for the edge device 1 to perform the bidirectional label forwarding. In this case, the exit edge device 1B transmits the labeled packet to the user communication device 4B led to the destination network. At this time, the exit edge device 1B may not rewrite the label.

Second Embodiment

Next, a second embodiment of the present invention will be discussed. The second embodiment has the common points to the first embodiment of which the repetitive explanations are herein omitted, and therefore the discussion will be focused on different points. The first embodiment is based on the premise that the user communication device 4A as the source does the label assignment in the UNI. According to the second embodiment, however, the entrance edge device 1A disposed on the entrance of the MPLS domain MD (the edge device functions the entrance/exit of the MPLS domain MD) does the label assignment in the UNI.

Figure 6:
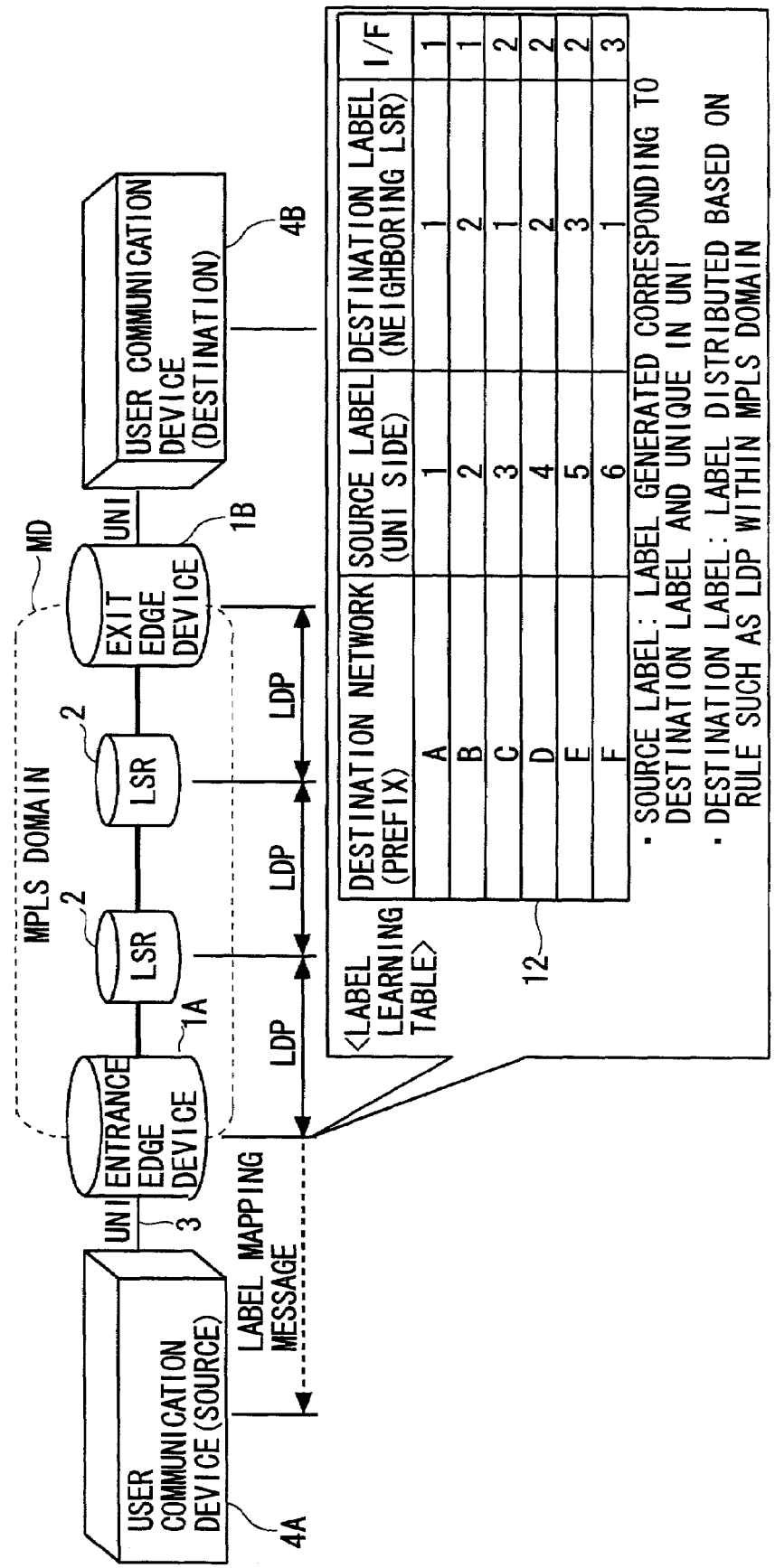
FIG. 6 is a view showing a second embodiment of the present invention.

FIG. 6 is a view showing the second embodiment of the present invention. FIG. 6 illustrates how the entrance edge device 1A performs the label assignment to the user communication device 4A.

In the second embodiment, the entrance edge device 1A internally generates a unique label (local label) related to the assigned label on the UNI side (i.e., on the side of the user communication device 4A), this label generation being triggered by the label assignment from a certain neighboring LSR at the next hop. Then, the entrance edge device 1A notifies the user communication device 4A of a tuple of the destination network and the label by a message (the LDP-based label mapping message shown in FIG. 7 is herein diverted as it is).

Figure 7:
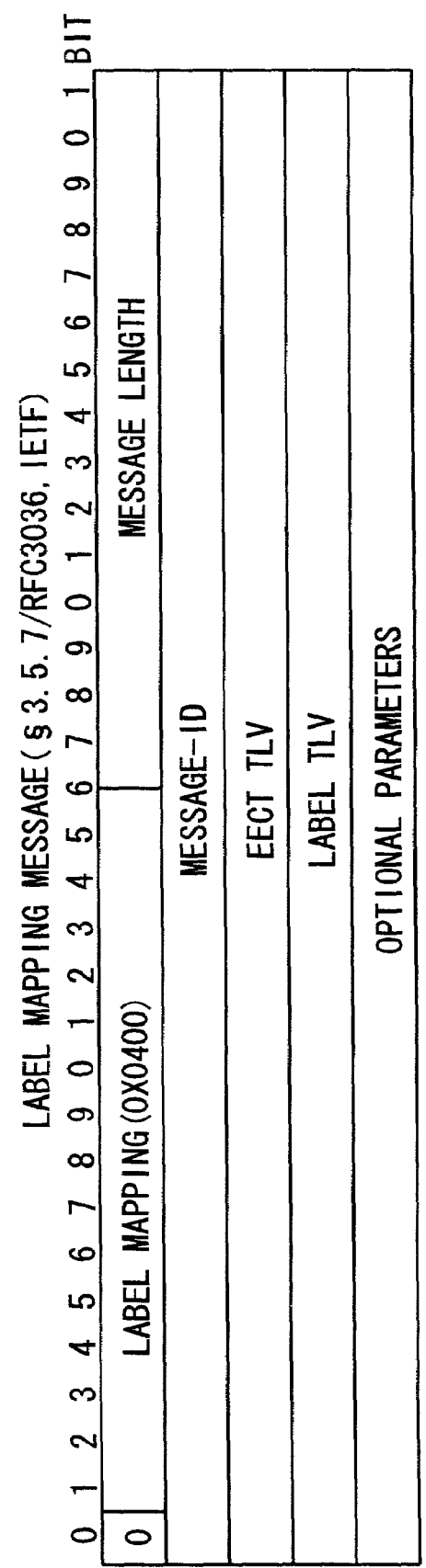
FIG. 7 is an explanatory diagram showing a format of a label mapping message.

As for the message, for instance, the LDP-based label mapping message shown in FIG. 7 can be diverted as it is. Then, for example, a local label value is stored in a Label TLV field, and the address of the destination network is stored in other field.

The new label assignment of the UNI by the entrance edge device 1A is based on the rule that "the label is locally unique on one single physical link", and it is permitted that the same label is used on a different physical link if the entrance edge device 1A has a plurality of physical links within the MPLS domain MD. Therefore, the entrance edge device 1A may create the label learning table 12 as shown in FIG. 6.

Figure 8:
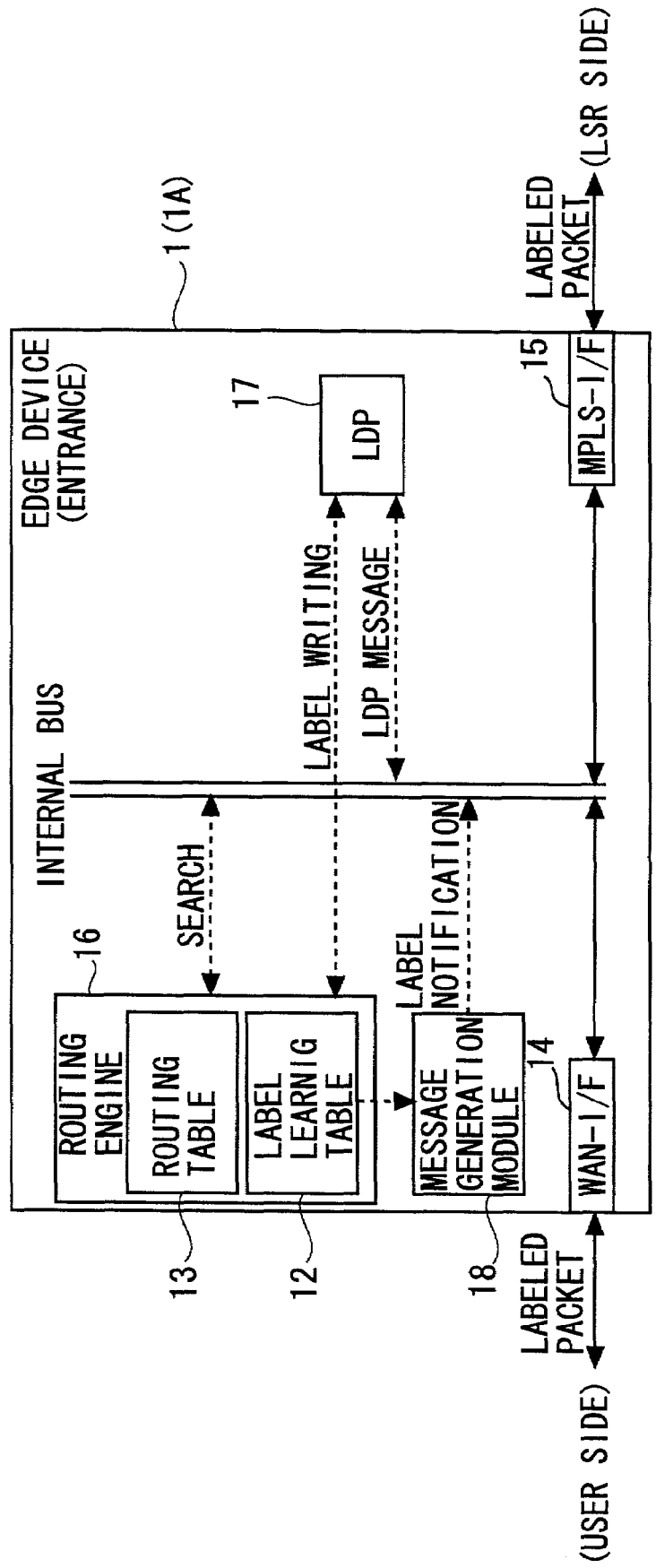
FIG. 8 is a view showing an example of the edge device in the second embodiment.

FIG. 8 is a view showing an example of the edge device 1 (1A) in the second embodiment. As shown in FIG. 8, the edge device 1 has such architecture (configure; structure) that a message generation module 18 is added to the architecture (FIG. 5) of the edge device explained in the first embodiment.

Referring to FIG. 8, the routing engine 16, as in the first embodiment, performs the operation of the routing protocol, generates and retains the routing table, and executes the forwarding process. Further, the routing engine 16 executes the process of generating the local label corresponding to the label of the next hop of which the neighboring LSR notifies.

The routing table 13 is stored with the routing information obtained by the operation of the routing protocol, and has substantially the same architecture (configure; structure) as that in the first embodiment.

The label learning table 12 retains the label on the UNI relating to a label that is used within the MPLS domain on the UNI on the basis of the routing information. The label learning table 12 has the same entry structure as the structure shown in FIG. 6. The entry structure itself is the same as in the first embodiment.

The LDP (LDP control module) 17 executes a signaling protocol (on which the label request message is transmitted and the label mapping message is received) for distributing (assigning) the label in the MPLS domain MD, thereby obtaining the label per destination network from the next hop (the neighboring LSR). Then, the LDP manager 17 writes the label in the label learning table 12 in a way that relates the label to the address of the destination network.

The message generation module 18 generates a message (that is the label mapping message in this example) for notifying the user communication device 4 of the label (local label) on the UNI that is stored in the label learning table 12 generated by the routing engine 16. The thus generated message is sent to the user communication device 4A from the corresponding WAN-I/F 14.

Note that the WAN-I/F 14 corresponds to a receiving module of the edge device, the routing engine 16 (the label learning table 12) corresponds to a retaining module, the routing engine 16 and the MPLS-I/F 15 correspond to a relay module, the routing engine 16 and the LDP manager 17 correspond to a generation module, and the message generation module and the WAN-I/F 14 correspond to a notifying module according to the present invention.

Figure 9:
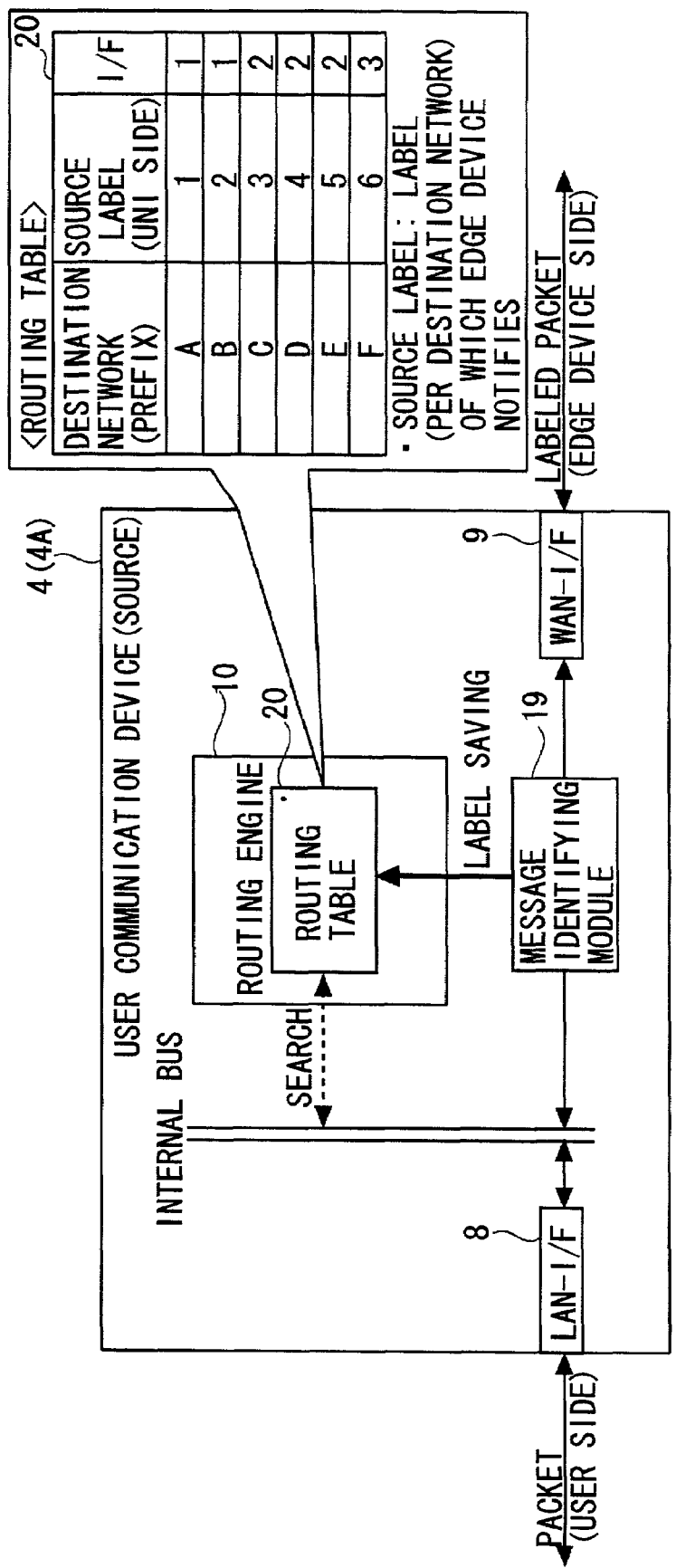
FIG. 9 is a view showing an example of the user communication device in the second embodiment.
Figure 10:
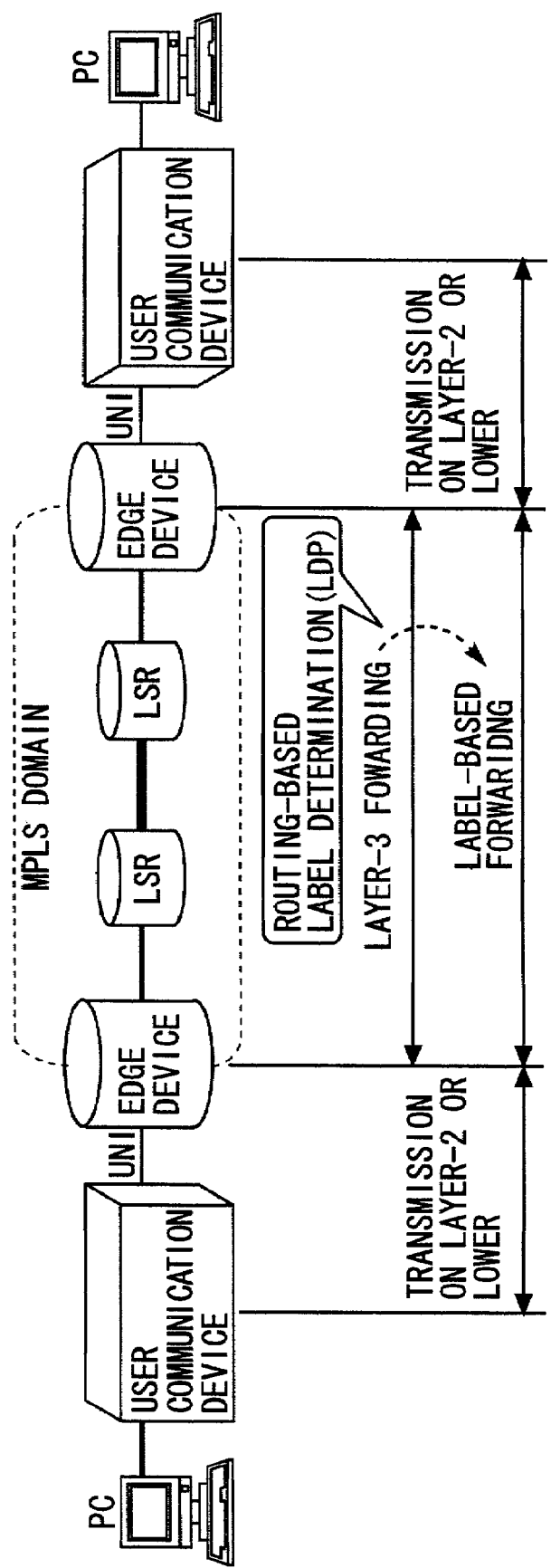
FIG. 10 is an explanatory view showing the prior art.

FIG. 9 is a view showing an example of the user communication device 4 (4A) in the second embodiment. As shown in FIG. 9, the user communication device 4 is provided with a message identifying module 19 as a substitute for the label generation module 11 (see FIG. 4).

Referring to FIG. 9, the routing engine 10 executes substantially the same processes as those in the first embodiment such as performing the operation based on the routing protocol, generating and retaining the routing table 20 and executing the packet forwarding process.

The routing table 20 is stored with the routing information (containing the address (prefix) of the destination network, the IP address of the next hop and the identifying information of the output I/F corresponding to the next hop) obtained by operating the routing protocol, and the local labels related thereto.

Namely, as shown in FIG. 9, the routing table 20 is stored with the entry for every destination network, and each entry contains the address of the destination network, the IP address (unillustrated) of the next hop, the source label (local label) on the UNI and the identifying information of the output I/F. The routing table 20 has the same structure as the label learning table 6 (see FIG. 4) in the first embodiment.

According to the second embodiment, the local label corresponding to the destination network is written in the entry of the routing table 20, whereby the routing table 20 includes the function of the label learning table 6 in the first embodiment. In this respect, as in the first embodiment, a table stored with the local label may be provided separately from the routing table.

The message identifying module 19 receives and identifies the message transmitted from the entrance edge device 1A and received by the WAN-I/F 9 (corresponding to the label receiving module according to the present invention), and, if this massage is categorized as the label mapping message, terminates this message. Then, the message identifying module 19 extracts (reads) the label information (that is the tuple of the destination network and the local label) contained in this message, and writes the extracted label information in the routing table 20.

After the label information has been written in the routing table 20, the user communication device 4A, when receiving the IP packet at the LAN-I/F 8 from the LAN side (user side), searches the routing table 20 by referring to the destination IP address in the IP packet, then confirms that the next hop is the entrance edge device 4A, attaches the label to the IP packet, and forwards the labeled IP packet from the corresponding WAN-I/F 9. The next hop can be confirmed from, e.g., the routing engine 10 being able to detect the local label corresponding to the destination network from the routing table 20.

Excluding the architecture described so far, the second embodiment is substantially the same as the first embodiment. The second embodiment is capable of acquiring the same effects (that are to relieve the processing load and to speed up the process when executing the forwarding process in the up direction) as those in the first embodiment. The edge device 1, however, notifies the user communication device 4 of the local label, and therefore the processing load on the edge device is greater than in the first embodiment.

Note that the second embodiment is based on the premise that the LDP operates based on the routing information within the MPLS domain MD, and the label mapping message itself (FIG. 7) defined in the LDP is appropriated for notifying the local label from the entrance edge device 1A to the user communication device 4A. In this respect, an independent message format may be defined between the user communication device 4 and the edge device 1 and may also be used.

As discussed above, according to the present invention, though the architecture involves slight changes in implementations in the user communication device and in the edge device, these changes in implementations give the effect of relieving the load on the forwarding process in the edge device. As a result, it is feasible to contribute to speed up the network services for the end users and to reduce the costs for these services.

It can be considered to acquire the same effects that the user communication device supports the MPLS itself. In this case, however, there is a large influence in terms of the implementation such as supporting the protocol (LDP) involving the use of the message for exclusive use of exchanging the label.

Further, the architecture according to the present invention includes the module A (the first embodiment) through which the user communication device itself locally generates the label, and the module B (the second embodiment) through which the edge device notifies the user communication device of the label (local label). The connection between the user communication device and the edge device is, however, the point-to-point connection. Hence, the following methods can be considered when the user communication device according to the present invention and the user communication device in the prior art, are connected to the edge devices of the present invention.

(1) In the case of utilizing the MPLS-based IP-VPN service to which the present invention is, it is assumed, applied, applies the carrier for service contents such as a circuit category, a circuit speed and priority control. Therefore, the function (the label switching that uses the local label) of the present invention is dynamically set enable and disable with respect to the UNI port (the WAN port (WAN interface) accommodating the user communication device) of the edge device, and the carrier statically sets the contents applied (which can be applied to the module A and the module B (in the first and second embodiments)).

(2) The user communication device of the present invention is set to send an acknowledgement message (Ack) with respect to the label (local label) of which the edge device notifies the user communication device. With this setting, the edge device judges that the sender is the prior art user communication device if the acknowledgement message is not sent back, and that the sender is the user communication device of the present invention if the acknowledgement message is sent back thus, the function (the label switching that uses the local label) of the present invention is dynamically set enable and disable by sue of the edge device (which can be applied to the module B (in the second embodiment)).

What is claimed is:

1. A communication device for transferring a packet via an MPLS domain to a destination network, comprising:
　a retaining module retaining a local label as a label assigned to the destination network and obtained by a method different from a label distribution method in the MPLS domain;
　a receiving module receiving the packet that should be forwarded to the destination network;
　a transmitting module transmitting the received packet toward an edge device disposed at an entrance of the MPLS domain; and
　an attaching module reading the local label corresponding to the destination network from said retaining module and attaching the local label to the packet that is transmitted by said transmitting module so that said edge device executes a forwarding process of the packet received from said communication device on the basis of the local label attached to the packet.

2. A user communication device according to claim 1, further comprising a generating module generating the local label retained by said retaining module.

3. A user communication device according to claim 1, further comprising a label receiving module receiving the local label from the MPLS domain, the local label is retained by said retaining module.

4. An edge device forwarding a packet received from a communication device of users side into an MPLS domain, comprising:

a retaining module retaining a local label as a label corresponding to a destination network of the packet received from said communication device and obtained by a method different from a label distribution method in the MPLS domain, and a label corresponding to the local label and obtained by the label distribution method in the MPLS domain;

a receiving module receiving a packet attached with the local label from said communication device; and a forwarding module reading, from said retaining module, the label corresponding to the local label attached to the packet received by said receiving module, then rewriting the local label attached to the packet with the read label, and transmitting the packet to the MPLS domain.

5. An edge device according to claim 4, wherein said forwarding module, if the local label attached to the packet is not retained by said retaining module, forwards into the MPLS domain the packet of which the local label is rewritten with a label corresponding to the destination network of the packet, and relates the local label attached to the packet to the label used for rewriting, and stores the local label and the label in said retaining module.

6. An edge device according to claim 4, wherein said receiving module receives the packet attached with the local label generated by said communication device.

7. An edge device according to claim 4, further comprising:

a generating module generating, if the label corresponding to the destination network of the packet that is received from said communication device is obtained by the label distribution method in the MPLS domain, a local label corresponding to the obtained label; and a notifying module notifying said communication device of the generated local label, wherein said receiving module receives from said communication device the packet attached with the local label of which the notifying module notified.

8. A packet forwarding method of a communication device transferring a packet via a MPLS domain to a destination network, comprising steps of:

retaining a local label as a label assigned to the destination network and obtained by a method different from a label distribution method in the MPLS domain;

receiving the packet that should be forwarded to the destination network;

transmitting the received packet toward an edge device disposed at an entrance of the MPLS domain; and reading the local label corresponding to the destination network and attaching the local label to the packet transmitted by said transmitting step so that said edge device executes a forwarding process of the packet received from said communication device on the basis of the local label attached to the packet.

9. A packet forwarding method according to claim 8, further comprising a step of generating the local label retained by said retaining step.

10. A packet forwarding method according to claim 8, further comprising a step of receiving the local label from the MPLS domain retained by said retaining step.

11. A packet forwarding method by an edge device forwarding a packet received from a communication device of users side into an MPLS domain, comprising steps of:

retaining a local label as a label corresponding to a destination network of the packet received from said communication device and obtained by a method different from a label distribution method in the MPLS domain, and a label corresponding to the local label and obtained by the label distribution method in the MPLS domain;

receiving a packet attached with the local label from said communication device; and reading, from said retaining module, the label corresponding to the local label attached to the packet, then rewriting the local label attached to the packet with the read label, and forwarding the packet into the MPLS domain.

12. A packet forwarding method by an edge device according to claim 11, wherein said forwarding step involves, if a local label attached to the packet is not retained by said edge device, the local label of the packet is rewritten with a label corresponding to the destination network, the packet is forwarded into the MPLS domain, and the local label is related to the label and stored.

13. A packet forwarding method by an edge device according to claim 11, wherein said receiving step involves receiving the packet attached with the local label generated by said communication device.

14. A packet forwarding method by an edge device according to claim 11, further comprising steps of:

generating, if the label corresponding to the destination network of the packet received from said communication device is obtained by the label distribution method in the MPLS domain, a local label corresponding to the label; and notifying said communication device of the generated local label, wherein said receiving step involves receiving the packet attached with the notified local label from said communication device.

* * * * *